United States Patent [19]

Goralnik

[11] 4,343,758

[45] * Aug. 10, 1982

[54] CUT GLASS WINDOW PANE

[76] Inventor: Charles D. Goralnik, 200 Brynwyck Pl., St. Louis County, Mo. 63141

[ * ] Notice: The portion of the term of this patent subsequent to Aug. 12, 1997, has been disclaimed.

[21] Appl. No.: 123,018

[22] Filed: Feb. 20, 1980

Related U.S. Application Data

[63] Continuation-in-part of Ser. No. 54,169, Jul. 2, 1979, Pat. No. 4,217,326.

[51] Int. Cl.³ .............................. B29C 9/00; B44F 1/06
[52] U.S. Cl. .................................... 264/254; 264/261; 264/337; 428/38
[58] Field of Search ..................... 52/308, 311; 156/63, 156/71; 264/247, 251, 254, 261, 263, 271, 275, 328.6, 337; 428/38

[56] References Cited

U.S. PATENT DOCUMENTS

| | | | |
|---|---|---|---|
| 2,847,712 | 8/1958 | Pollard et al. | 264/259 |
| 2,991,213 | 7/1961 | Williams | 428/38 X |
| 3,382,134 | 5/1968 | Powell | 428/38 |
| 3,420,728 | 1/1969 | Haverstock | 428/139 X |
| 3,512,320 | 5/1970 | Ferron et al. | 428/38 X |
| 3,713,958 | 1/1973 | McCracken | 428/38 |
| 4,068,441 | 1/1978 | Shaffer | 52/308 |
| 4,127,689 | 11/1978 | Holt | 428/38 |

Primary Examiner—Henry F. Epstein
Attorney, Agent, or Firm—Senniger, Powers, Leavitt and Roedel

[57] ABSTRACT

A method of making a window pane comprising a cut glass panel including a plurality of glass pieces and cames arranged in a predetermined pattern between adjacent edges of the glass pieces and having flanges on both sides of the pane. The method comprises providing a mold having grooving in the pattern of the cames, introducing moldable material into the grooving, allowing the moldable material to set in the mold to form the flanges for one side of the window pane, and removing the flanges from the mold. The glass pieces are positioned on the same or a similar mold with the edges of each glass piece spaced from the edges of the adjacent glass pieces in the predetermined pattern, the spaces between adjacent glass pieces being in register with the grooving. Moldable material is introduced in the spaces to fill the grooving and the spaces, and allowed to set so as to form the flanges on the other side of the glass pieces and the webs of the cames, the previously formed flanges for one side of the window pane being bonded to the window pane in register with the webs of the cames.

12 Claims, 7 Drawing Figures

U.S. Patent  Aug. 10, 1982  4,343,758
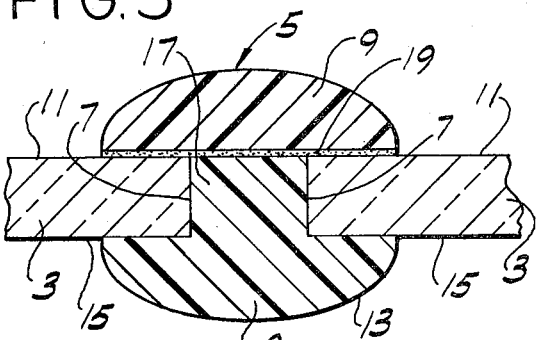
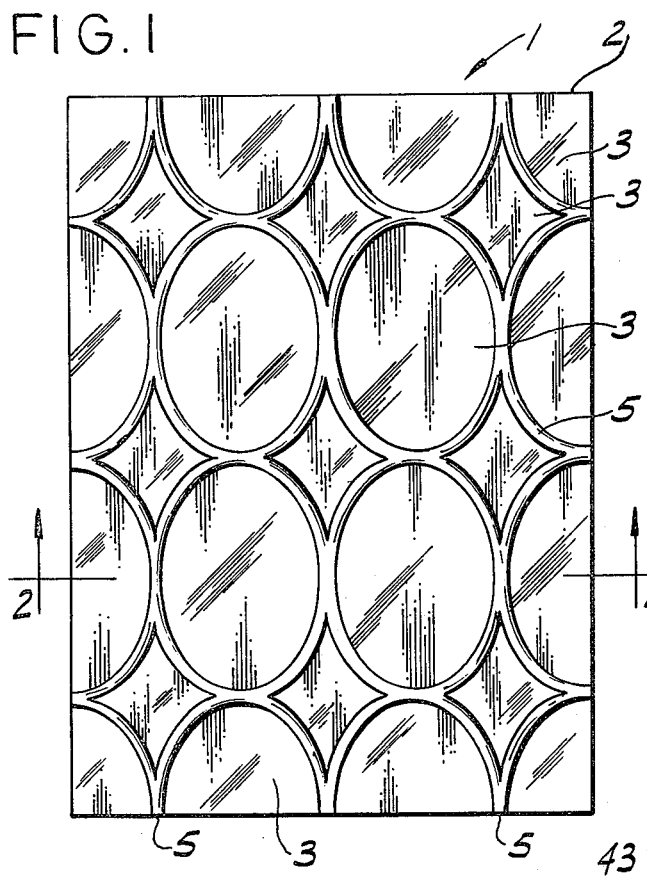
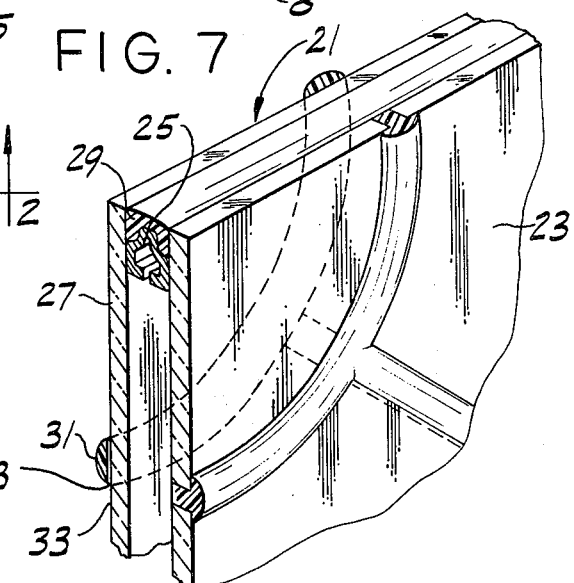
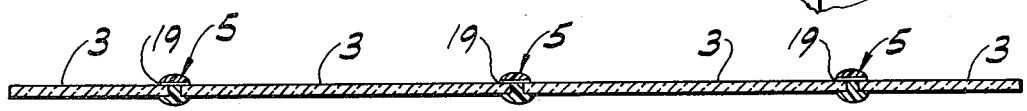
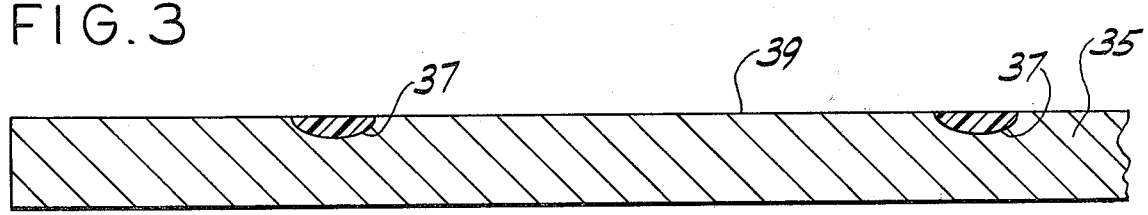
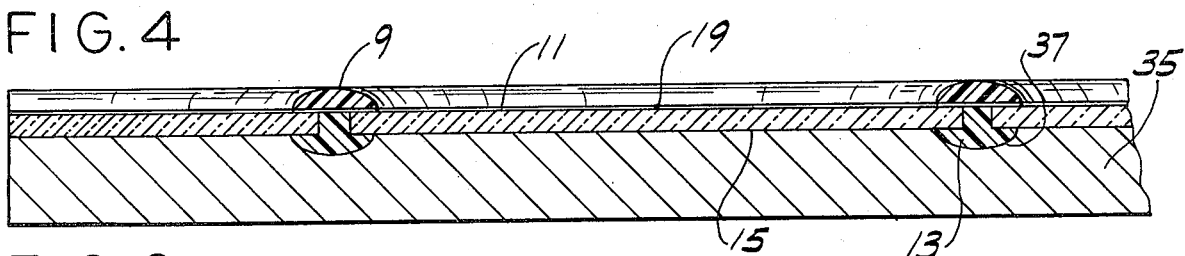
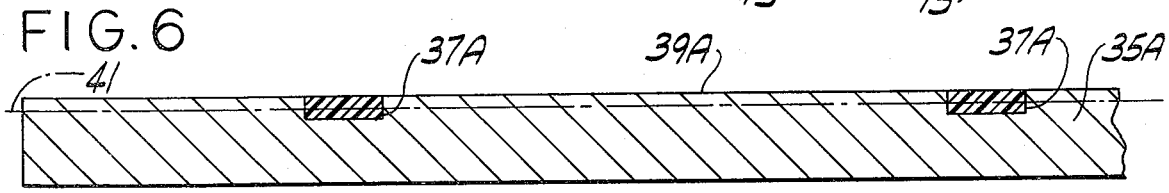

CUT GLASS WINDOW PANE

CROSS-REFERENCE TO RELATED APPLICATION

This application is a continuation-in-part of my co-pending U.S. patent application Ser. No. 54,169 filed July 2, 1979, now U.S. Pat. No. 4,217,326.

BACKGROUND OF THE INVENTION

This invention relates to window panes, and more particularly to window panes comprising a cut glass panel including a plurality of glass pieces and cames arranged in a predetermined pattern between adjacent edges of the glass pieces, and a method of making such window panes.

This invention is an improvement over the prior art cut glass window panes such as shown for example in U.S. Pat. No. 4,068,441 comprising a cut glass panel including a plurality of cut glass pieces and cames arranged in a predetermined pattern between adjacent edges of the glass pieces. The cames are of T-section having webs and flanges on one side of the glass pieces for securing the glass pieces together. When viewed from one side, (i.e., the decorative side) the window pane simulates a leaded cut glass panel with lead cames between adjacent glass pieces and flanges over the spaces between the glass pieces. However, when viewed from the other side (i.e., the unfinished side), the window pane does not have a flange and, thus, does not resemble a leaded cut glass panel. Moreover, in molding cames between the glass pieces excess molding material is often inadvertently spread on the glass pieces and air bubbles often form in the adhesive material at the unfinished side of the cut glass panel during the molding process, thereby giving the unfinished side of the window pane an undesirable appearance. While it is possible to trim off the excess adhesive and with it some of the air bubbles to improve the appearance of the unfinished side of the window pane, the window pane still is not satisfactory for those applications where it is to be viewed from both sides.

The prior art window pane may further include a spacer at the edge margins of the unfinished side of the cut glass panel and a sheet of plain glass on the spacer over the unfinished side of the cut glass panel. The spacer and the sheet of glass increase the structural strength of the window pane and create a dead air space for reducing the thermal conductivity of the window pane. However, because the unfinished side of the cut glass panel is still visible through the sheet of plain glass, the window pane is still not satisfactory for those applications where the window pane is to be viewed from both sides.

SUMMARY OF THE INVENTION

Among the several objects of this invention may be noted the provision of a window pane resembling at both sides thereof a leaded cut glass panel, in particular a leaded cut glass panel which has preformed H-section lead cames between the glass pieces; the provision of such a window pane in which any excess moldable material and any air bubbles entrained in the material during the molding process are not visible from either side of the window pane; the provision of such window pane having sufficient structural strength and air impermeability without the operation of roughening the edges of the glass pieces; the provision of a method for producing such a window pane; and the provision of such a method which is less costly and less time-consuming than the prior art methods.

Briefly, the window pane of this invention comprises a cut glass panel including a plurality of cut glass pieces and comes arranged in a predetermined pattern between adjacent edges of the glass pieces, the cames comprising webs bonding the pieces of glass together. The window pane further comprises a first set of flanges on one side of the cut glass panel over the webs of the cames, spacing means on the other side of the cut glass panel, a sheet of glass in engagement with the spacing means, the spacing means holding the sheet of glass in spaced relation relative to the cut glass panel, means securing the spacing means, the cut glass panel, and the sheet of glass together, and a second set of flanges on the side of the sheet of glass away from the cut glass panel, the second set of flanges being in register with the webs of said cames and said first set of flanges.

Briefly, the method of this invention of making said window pane including a cut glass panel comprises providing a mold having grooving in the pattern of the cames of the panel, introducing moldable material into the grooving in the mold to fill the grooving, allowing the moldable material to set in the mold to form flanges for one side of the window pane and removing the flanges from the mold, positioning the glass pieces on the same or a similar mold with the edges of each glass piece spaced from the edges of the adjacent glass pieces in the predetermined pattern and with the spaces between adjacent glass pieces being in register the grooving, introducing sufficient moldable material between the edges of the glass pieces to fill the grooving and the spaces between the adjacent glass pieces to form the webs of the cames, the flanges for said one side of the window pane being bonded in place on said one side of the window pane in register with the webs of the cames.

Other objects and features will be in part apparent and in part pointed out hereinafter.

BRIEF DESCRIPTION OF THE DRAWINGS

FIG. 1 is an elevation of a window pane made according to the method of this invention;

FIG. 2 is an enlarged section of line 2—2 of FIG. 1 with parts removed;

FIG. 3 is an enlarged section of a mold with grooving therein showing flanges for one side of the window pane cast in the grooving;

FIG. 4 is a view similar to FIG. 3 but showing glass pieces on the mold and the flanges previously formed on the glass pieces;

FIG. 5 is an enlarged fragment of FIG. 2 showing the flanges on both sides of the glass pieces and a web between the glass pieces;

FIG. 6 is a view similar to FIG. 3 but showing a mold with grooving of an alternative cross-section; and FIG. 7 is perspective sectional view of an alternative embodiment of the window pane of this invention.

Corresponding reference characters indicate corresponding parts throughout the several views of the drawings.

DESCRIPTION OF THE PREFERRED EMBODIMENT

Referring to FIGS. 1-6, there is generally indicated at 1 a window pane made according to the method of this invention, comprising a cut glass panel 2 including a plurality of plain or colored glass pieces 3 and cames 5 arranged in a predetermined pattern between adjacent edges 7 of the glass pieces. While the shape of the individual glass pieces 3 and the pattern of the spacings between the edges 7 of the glass pieces may vary according to the desired appearance of the cut glass panel 2, the width of the spacings for any given panel should be substantially uniform throughout the panel 2. The cames 5 are of a moldable material 8, such as a two-part epoxy resin, and each came comprises flanges 9 at one side 11 of the glass pieces 3, flanges 13 at the other side 15 of the glass pieces 3 and webs 17 between the flanges 9 and 13 (see FIG. 5), the flanges 9 being bonded to the glass pieces 3 and the edges of the webs 17 at side 11 of the glass pieces either by the moldable material 8 constituting the flanges 9 or by a suitable adhesive 19, such as a two-part epoxy resin.

Referring to FIG. 7, there is indicated at 21 an alternative embodiment of the window pane made according to the method of this invention comprising a cut glass panel 23 similar to the cut glass panel 2 but without flanges such as 9 adhered to one side of the glass pieces. The window pane 21 further comprises spacing means 25 such as a tubular aluminum extrusion at the edge margins of the unfinished side of the cut glass panel 23, a sheet of plain or tinted glass 27 in engagement with the spacing means 25, the spacing means holding the sheet of glass in spaced relation relative to the cut glass panel 23, means such as a polysulfide caulking material 29 applied along the peripheral edges of the spacing means, for securing the spacing means, the cut glass panel and the sheet of glass together in sealed relation, and a set of flanges 31 similar to the flanges 9 of the cut glass panel 2 bonded to the side 33 of the sheet of glass 27 away from the cut glass panel 23, the flanges 31 being in register with the cames and flanges of the cut glass panel. The sheet of glass 27 and the spacing means 25 create a dead air space for reducing the thermal conductivity of the window pane 21 and increase the structural strength of the window pane. The sheet of glass is preferably spaced a short distance from the cut glass panel (e.g., ⅜") so that the unfinished side of the cut glass panel 23 when viewed through the sheet of glass 27 resembles a leaded cut glass panel.

A further alternative embodiment (not shown) of the window pane of this invention is similar to the window pane 21 except that its cut glass panel has flanges on both sides thereof, and there are no flanges on its sheet of glass.

In the method of making the window pane 1, a mold 35 having grooving 37 in a upper face 39 thereof in the pattern of the cames 5 is provided. Preferably, the upper face of the mold 35 (i.e., the surface of the mold defining the grooving) is made of a silicone rubber material, which material does not react with epoxy resin and is resistant to heat which may be applied to the mold 35 to speed the setting of thermosetting moldable material such as epoxy resin. Sufficient epoxy resin 8 is then introduced into the grooving 37 in the upper face 39 of the mold to fill the grooving. The grooving is of a cross-sectional shape corresponding to the desired cross-sectional shape of the flanges 9 and 13. Grey pigment may be added to the epoxy resin to give it the appearance of lead. A filler material having a coefficient of expansion similar to that of glass, such as ground glass, magnesium oxide or limestone, may also be added to the epoxy resin to reduce stress in the cames 5 in the cut glass panel 2 caused by changes in the temperature of the panel. The epoxy resin 8 is then allowed to set in the mold 35 to form the flanges 9 for one side 11 of the glass pieces 3. The period necessary for the setting of thermosetting moldable material such as epoxy resin can be shortened by heating the panel during the setting by conventional heating means such as infrared heat lamps (not shown). Once set, the array of flanges 9 is removed from the mold.

Thereafter, the glass pieces 3 which may be beveled on one or on both sides thereof are positioned on the mold 35 or on a second mold similar to the mold 35 with the edges 7 of each glass piece spaced from the edges 7 of the adjacent glass pieces in the predetermined pattern and with the spaces between adjacent glass pieces 3 above the grooving 37. The glass pieces may be releasably secured to the upper face 39 of the mold 19 by conventional means, such as vacuum means or mechanical locking levers (not shown). Epoxy resin 8 is then introduced between the glass pieces 3 in sufficient quantity to fill the grooving 37 in the mold and the spaces between adjacent glass pieces 3. The epoxy resin 8 is allowed to set in the grooving 37 to form the array of flanges 13 for the other side 15 of the glass pieces, and to set in the spaces between the glass pieces 3 to form the webs 17 of the cames 5. The panel 1 may be heated to hasten the setting of the epoxy resin. During setting, the moldable material, such as epoxy resin, having adhesive properties will bond to the edges 7 of the glass pieces and to portions of the side 15 of the glass pieces adjacent the edges 7 so as to make the spaces between the glass pieces 7 air impermeable.

The array of flanges 9 for the side 11 of the glass pieces 3 is bonded in place to the cut glass pieces in register with the webs 17 of the cames 5 by applying adhesive 19 to the flanges 9 or the glass pieces 3 and webs 17, positioning the flanges over the webs, and allowing the adhesive to set. With the cames 5 and flanges 13 bonded to the glass pieces 3 and with flanges 9 provided on side 11 of the cut glass panel 2, adequate structural strength for the window panel 1 is provided without the costly and time-consuming prior art method step of roughening the edges 7 of the glass pieces, as by "frosting" or "penciling". In addition, during setting of the epoxy resin any air entrained in the epoxy resin that rises in the form of bubbles to the upper surface of the webs 17 is hidden from view from side 11 of the panel by the flange 9, if the flanges 9 are opaque, as is preferred. Upon the setting of the adhesive 19, the window pane 1 with the cames 5 between the glass pieces is 3 removed from the mold 19.

Prior to positioning the array of flanges 9 on the upper surface (i.e., side 11) of the glass pieces 3, it is often desirable to invert the flanges 9 so that the upper surface of the flanges when in the mold become the surfaces of the flanges 9 engaging the upper surface of the glass pieces on the mold. To provide the necessary correspondence of the flanges 9 when inverted to the grooving 37 in the mold 35, either the predetermined pattern in the mold must be a mirror image about a central plane thereof, or there must be two molds, the first mold (i.e., the mold in which the flanges 9 are formed) having grooving in the upper face thereof in a pattern constituting a mirror image of the predetermined pattern of the cames 5, the second mold (i.e., the mold in which the flanges 13 are formed) having grooving in the upper face thereof in the predetermined pattern of the cames. It is, however, possible to form the panel 2 without inverting the flanges 9. When a cut glass panel with only one decorative side is needed, flanges 9 such as those cast in mold 35 (see FIG. 3) can be positioned on the upper surface (i.e., side 11) of the glass pieces 3 without inverting the flanges 9. While the cames 5 would not be symmetrical about a central plane and air bubbles at the upper surface of the flanges 9 might be visible from the side 11 of the panel 2, such a panel would have sufficient structural strength and air impermeability. When a window pane 1 is to be viewed from both sides, it is nonetheless possible to make the panel without inverting the flanges 9 either by dressing the outer surface of the flanges 9 to resemble that of the flanges 13 or by casting the flanges in a mold (see FIG. 6) having grooving 37A in the upper face 39A thereof of a cross-sectional shape symmetrical about a central grooving plane 41 parallel to the upper face 39A of the mold 35A.

In the method of making the window pane 21 shown in FIG. 7, the cut glass panel 23 is made in a method similar to the above-described method for making the cut glass panel 2 except that flanges are not bonded to one side of the cut glass panel 23. The spacing means 25 which is configured to extend along the edge margins of the cut glass panel 23 is placed on the side of the cut glass panel 23 without flanges (i.e., the unfinished side), and the sheet of glass 27 which is of the same size and shape as the cut glass panel is placed on the spacing means. The polysulfide caulking material 29 is applied at the peripheral edges of the spacing means for securing the cut glass panel 23, the spacing means 25 and the sheet of glass together in sealed relation. The flanges 31 are bonded on side 33 of the sheet of glass 27 in register with the cames of the cut glass panel 23 by applying suitable adhesive 43 such as a two-part epoxy to the flanges 31 or the sheet of glass 27, positioning the flanges over the webs, and allowing the adhesive to set.

In the method of making the alternative embodiment of the window pane (not shown) comprising a cut glass panel having flanges on both sides thereof, a spacer, and a sheet of glass at one side of the cut glass panel, the cut glass panel is made in a method similar to the above-described method for making the cut glass panel 2 or similar to the method described in my copending U.S. application Ser. No. 54,169 filed July 2, 1979 now U.S. Pat. No. 4,217,326. The flanges at the edge margins on one side of the cut glass panel are trimmed so that the spacing means can engage the glass pieces of the cut glass panel. The spacing means and the sheet of glass are secured to the cut glass panel in a method similar to the above-described method for making the window pane 21.

It is contemplated that in lieu of the above-described methods in which the moldable material (i.e., epoxy resin 8) is allowed to set in the grooving 37 in the mold 35 to form the flanges 9, 31 for one side of the window pane (1, 21 respectively), and the flanges 9, 31 removed from the mold, positioned on the respective window pane, and bonded thereto by the adhesive 19, 43 applied between the flanges and the window pane, the flanges 9, 31 could be bonded to the respective window pane by positioning the window pane on the upper surface 39 of the mold 35 with the flanges 9, 31 in the grooving 37 and with the adhesive 19, 43 applied between the window pane and the upper surface of the flanges, and allowing the adhesive to set, thereby bonding the flanges to the window pane. Alternatively, the flanges 9, 31 could be bonded to the respective window pane by positioning the window pane on the upper surface 39 of the mold 35 with the moldable material 8 in the grooving 37 prior to the moldable material setting to form the flanges 9, 31, the flanges being bonded in place on the window pane upon allowing the moldable material to set.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of making a window pane comprising a cut glass panel including a plurality of glass pieces and cames of synthetic resin arranged in a predetermined pattern between adjacent edges of the glass pieces and having flanges on both sides of the window pane; said method comprising:

providing a mold of an elastomeric material which is nonreactive with the synthetic resin, the mold having grooving in its upper surface in the pattern of the cames, introducing moldable synthetic resin into the grooving in the mold to fill the grooving, the grooving being of a cross sectional shape corresponding to the cross sectional shape of the flanges;

allowing the synthetic resin to set in the mold to form the flanges for one side of the window pane;

removing said flanges from the mold;

thereafter positioning the glass pieces on the same mold with the edges of each glass piece spaced from the edges of the adjacent glass pieces in the predetermined pattern, the spaces between adjacent glass pieces being in register with the grooving;

introducing sufficient moldable synthetic resin between the edges of the glass pieces to fill the grooving and to fill the spaces between the adjacent glass pieces; and allowing the synthetic resin to set in the grooving to form the flanges for the other side of the window pane, and to set in the spaces between the glass pieces to form the webs of the cames, the flanges for said one side of the window pane being bonded in place on said one side of the window pane in register with the flanges on the other side of the window pane.

2. The method of claim 1 further comprising the steps of positioning the flanges for said one side of the window pane on said one side of the window pane with an adhesive applied between said flanges and the window pane, and allowing the adhesive to set, thereby bonding said flanges for said one side of the window pane to the window pane.

3. The method of claim 1 wherein the synthetic resin is a two-part epoxy resin.

4. The method of claim 1 wherein the mold is of silicone rubber.

5. A method of making a window pane comprising a cut glass panel including a plurality of glass pieces and cames of synthetic resin arranged in a predetermined pattern between adjacent edges of the glass pieces and having flanges on both sides of the window pane; said method comprising:

providing a mold of an elastomeric material which is nonreactive with the synthetic resin, the mold having grooving in its upper surface in the pattern of the cames, introducing moldable synthetic resin into the grooving in the mold to fill the grooving, the grooving being of a cross sectional shape corresponding to the cross sectional shape of the flanges;

allowing the synthetic resin to set in the mold to form the flanges for one side of the window pane;

removing said flanges from the mold;

positioning the glass pieces on the same or a similar mold with the edges of each glass piece spaced from the edges of the adjacent glass pieces in the predetermined pattern, the spaces between adjacent glass pieces being in register with the grooving;

introducing sufficient moldable synthetic resin between the edges of the glass pieces to fill the grooving and to fill the spaces between the adjacent glass pieces; and allowing the synthetic resin material to set in the grooving to form the flanges for the other side of the window pane, and to set in the spaces between the glass pieces to form the webs of the cames;

providing a sheet of glass and spacing means;

positioning the spacing means on a side of the cut glass panel and the sheet of glass on the spacing means;

securing the spacing means, the sheet of glass, and the cut glass panel together; and bonding the flanges for one side of the window pane to the sheet of glass at the side thereof away from the cut glass panel in register with the flanges on the other side of the window pane.

6. The method of claim 5 further comprising the steps of positioning the window pane on the mold after the synthetic resin in the grooving in the mold has set to form the flanges for said one side of the window pane with an adhesive applied between said flanges for said one side of the window pane and said one side of the window pane, and allowing the adhesive to set, thereby bonding said flanges for said one side of the window pane to the window pane.

7. The method of claim 5 wherein the spacing means, the sheet of glass, and the cut glass panel are secured together by caulking material.

8. The method of claim 7 wherein the spacing means, the sheet of glass and the cut glass panel are secured together in sealed relation along the peripheral edges of the spacing means.

9. The method of claim 5 wherein the grooving is in the upper surface of the mold and wherein the method further comprises the step of inverting said flanges for said one side of the window pane prior to bonding them on said one side of the window pane, so that the upper surfaces of said flanges for said one side of the window pane when in the mold become the surfaces engaging said one side of the window pane, said predetermined pattern being a mirror image about a plane bisecting the pattern.

10. The method of claim 5 wherein said flanges for one side of the window pane are formed in a first mold having grooving in the upper face thereof in a pattern constituting a mirror image of the pattern of the cames, said flanges for the other side of the window pane being formed in a second mold having grooving in the upper face thereof in the pattern of the cames, said method further comprising the step of inverting said flanges for said one side of the window pane prior to bonding them on said one side of the window pane so that the upper surfaces of said flanges for said one side of the window pane when in the mold become the surfaces thereof engaging said one side of the window pane.

11. The method of claim 5 wherein the grooving is in the upper surface of the mold and wherein the cross-section of the grooving in the mold and the flanges formed therein symmetrical about a central grooving plane parallel to the upper face of the mold.

12. The method of claim 5 further comprising the step of positioning the window pane on the mold with the synthetic resin in the grooving therein prior to the synthetic resin setting in the mold to form said flanges for said one side of the window pane, said flanges for one side of the window pane being bonded in place on the window pane upon allowing the synthetic resin to set.

* * * * *